US010972866B1

(12) United States Patent
MacDonald-Korth et al.

(10) Patent No.: US 10,972,866 B1
(45) Date of Patent: Apr. 6, 2021

(54) FOOT TRAFFIC MANAGEMENT SYSTEM

(71) Applicant: Presenteur Inc., Portland, OR (US)

(72) Inventors: Rita Ibolya MacDonald-Korth, Coral Gables, FL (US); James Duncan MacDonald-Korth, Coral Gables, FL (US)

(73) Assignee: Presenteur Inc., Portland, OR (US)

( * ) Notice: Subject to any disclaimer, the term of this patent is extended or adjusted under 35 U.S.C. 154(b) by 0 days.

(21) Appl. No.: 16/776,365

(22) Filed: Jan. 29, 2020

(51) Int. Cl.
*H04W 4/02* (2018.01)
*H04W 4/021* (2018.01)
*H04W 4/029* (2018.01)
*G06Q 30/02* (2012.01)
*G06Q 30/06* (2012.01)

(52) U.S. Cl.
CPC ........ *H04W 4/023* (2013.01); *G06Q 30/0201* (2013.01); *G06Q 30/0261* (2013.01); *G06Q 30/0625* (2013.01); *H04W 4/021* (2013.01); *H04W 4/025* (2013.01); *H04W 4/029* (2018.02)

(58) Field of Classification Search
CPC ..... H04W 4/023; H04W 4/029; H04W 4/021; H04W 4/025; G06Q 30/0201; G06Q 30/0261; G06Q 30/0625
USPC .......................................... 455/456.1–456.6
See application file for complete search history.

(56) References Cited

U.S. PATENT DOCUMENTS

| | | | | |
|---|---|---|---|---|
| 8,254,961 B2* | 8/2012 | Moon | ................... | G06Q 30/02 455/456.3 |
| 9,838,848 B2* | 12/2017 | Lovich | .................. | H04W 4/029 |
| 10,387,896 B1* | 8/2019 | Hershey | ................. | H04N 5/247 |
| 10,552,491 B2* | 2/2020 | Jones | .................... | G06F 16/907 |
| 10,572,846 B2* | 2/2020 | Carlson | .............. | G06F 3/04842 |
| 10,614,474 B2* | 4/2020 | Poole | ................... | G06Q 10/087 |
| 10,719,861 B2* | 7/2020 | Bonner | .............. | G06Q 30/0261 |
| 2011/0099047 A1* | 4/2011 | Weiss | ..................... | G06Q 30/00 705/7.34 |
| 2013/0252633 A1* | 9/2013 | Liang | .................... | H04W 4/029 455/456.1 |
| 2014/0279002 A1* | 9/2014 | Grigg | ................. | G06Q 30/0261 705/14.58 |
| 2015/0262197 A1* | 9/2015 | Chao | .................. | G06Q 30/0201 705/7.34 |
| 2016/0371722 A1* | 12/2016 | Maginnis | ........... | G06Q 30/0261 |

(Continued)

Primary Examiner — Mong-Thuy T Tran
(74) Attorney, Agent, or Firm — Knobbe, Martens, Olson & Bear, LLP (57) ABSTRACT

Systems and methods are described for dynamically updating the floor plan of a retail store, and for associating retail transactions with particular mobile devices, based on detection and attribution of foot traffic within the store. A foot traffic attribution system detects mobile devices accessing a wireless network. The foot traffic attribution system uses information obtained from the mobile devices to determine foot traffic data, such as locations of mobile devices relative to item display areas, direction of travel of mobile devices, durations of time spent in various areas, and similar information. The foot traffic attribution system then attributes the foot traffic data to items on display and/or item display areas in the current floor plan, and determines an updated floor plan. The foot traffic attribution system may also access retail transaction data, and may use the foot traffic data to associate retail transactions with particular mobile devices.

18 Claims, 5 Drawing Sheets

(56) References Cited

U.S. PATENT DOCUMENTS

2017/0024756 A1* 1/2017 Hulth ................. G06Q 30/0207
2017/0193553 A1* 7/2017 Busch ................ G06Q 30/0256

* cited by examiner

FOOT TRAFFIC MANAGEMENT SYSTEM

BACKGROUND

Generally described, "brick and mortar" stores are physical environments in which items (e.g., goods and services) are displayed. The design and layout of such stores, and the placement of the items within the store, may influence buyer behavior. For example, the operator of a retail store may seek to place items that are expected to be popular in a location that draws foot traffic into the store from outside, or that draws shoppers already in the store to walk past and consider buying other available items.

The operator of a retail store may also implement a "store within a store," which may be referred to generally as a concession store. A concession store may offer items that are not otherwise available in the retail store. For example, the operator of a retail store may implement a concession store to evaluate whether certain items should be added to the retail store's inventory.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure are directed to systems, methods, and computer-readable media for monitoring foot traffic within a retail store, associating sales transactions with particular customers and/or mobile devices based on foot traffic data, and dynamically updating the floor plan of the store based on the foot traffic data. Illustratively, a retail store may offer a set of items for sale, and these items may be displayed in various areas within the store. Display areas may include, for example, shelves, tables, racks, mannequins, and other similar displays. When determining which items the store should offer, and when determining where and how these items should be displayed, the retail store operator may wish to evaluate whether an item generates "foot traffic"—that is, whether the item entices shoppers to enter or remain in the store, independently of whether the item generates sales or profits. The retail store operator may also wish to determine the display area for an item according to whether the item generates foot traffic. For example, the operator may choose to display popular items in areas that are visible from outside the store (e.g., window displays) in order to attract shoppers, or may choose to put items that drive high volumes of foot traffic near items that are "impulse buys" or near items that are likely to sell in conjunction with the popular item. The retail store operator or a third party (e.g., a provider of an app on the shopper's mobile device) may further wish to determine associations between mobile device activities, foot traffic, and/or retail sales transactions.

However, isolating the foot traffic to associate with a particular item, shopper, and/or transaction is a non-trivial challenge. Shoppers may visit several areas of the store, and it may be difficult to determine which item or items are responsible for the resulting foot traffic. The store's layout may also include foot traffic areas that do not correspond to a single product display area, such as an aisle that has product displays on either side of it. Tracking the locations of shoppers as they move about the store may also interfere with or discourage the act of shopping, and may require significant investment in equipment (e.g., cameras, motion tracking devices, etc.) and/or personnel.

To address these problems, the operator of a retail store may implement a foot traffic management system. In some embodiments, the foot traffic management system may be implemented in conjunction with a concession store (e.g., a "store within a store"), which may provide display areas for a set of items that the store operator wishes to evaluate. The foot traffic management system may track shoppers within the concession store by obtaining location data associated with mobile devices carried or worn by the shoppers, and may use the location data to determine the locations of the mobile devices with a high degree of accuracy relative to the item display areas within the concession store. The foot traffic management system may then determine foot traffic data from the location data, and may attribute the foot traffic data to particular items or particular item display areas within the concession store. Similarly, the foot traffic management system may associate foot traffic generated by a particular shopper (e.g., a shopper carrying a particular mobile device) with a particular sales transaction, and may associate the transaction with an activity on the mobile device, such as using a particular app or receiving an impression of an advertisement.

In some embodiments, the foot traffic management system may store and utilize historical foot traffic data in order to determine various characteristics of the foot traffic. For example, the foot traffic management system may determine the locations of mobile devices within a concession store at periodic intervals, such as once every ten seconds. The foot traffic management system may then use this historical foot traffic data, together with foot traffic data regarding the current location of the mobile device, to determine characteristics of the foot traffic such as a direction of travel of the mobile device, a direction in which the shopper is predicted to be facing, a duration of time spent in front of a particular display area, whether the shopper is moving toward or away from a display area, and so forth.

In some embodiments, the foot traffic management system may obtain data from additional sources to analyze and compare to the foot traffic data. For example, the foot traffic management system may obtain timestamped transaction data from a point of sale system, and may identify foot traffic data that coincided with or recently preceded the transaction time. The foot traffic management system may thus identify items that were browsed but not purchased, or may identify items that were seen and sold because they were located near an item that generated foot traffic In further embodiments, the foot traffic management system may obtain unique mobile device identifiers associated with portions of the foot traffic data, and may cross-reference the mobile device identifiers with the timestamped transaction data to identify individual customers.

The foot traffic management system may further generate updated floor plans for the concession store or retail store based on the attributed foot traffic data. For example, the foot traffic management system may generate an updated floor plan that increases the size of a display area for an item that generates high volumes of foot traffic, or that recommends adding or removing an item from the concession store based on the item's foot traffic (or lack thereof). As described in more detail below, the foot traffic management system may optimize the assignments of items to item display areas based on the foot traffic volume attributed to the items.

It will be understood that the foot traffic management system described herein provides a technical solution to a resource allocation problem, and that the described technical solution is one that cannot practically be performed in the human mind. For example, the human mind cannot calculate distances between the devices described herein to the degree of accuracy needed to implement the technical solution. It will further be understood that the present disclosure is not directed to the commercial interactions or human activities that take place within a retail store, but rather is directed to the efficient allocation of items and resources (e.g., floor space) within the physical layout of the building.

Although examples are described herein with reference to a concession store located within a retail store, it will be understood that aspects of the present disclosure are not limited to such embodiments, and that a concession store or other "store within a store" is not required to practice these embodiments. For example, a retail store may use a foot traffic management system to identify items that generate foot traffic regardless of whether these items are displayed in a concession store. It will further be understood that foot traffic does not necessarily correspond to items sales volumes, and that an item may generate foot traffic (and thereby lead to sales of other items) even if the item has a relatively low sales volume. For example, an operator of a retail store may determine that an expensive or novel item is driving foot traffic and increasing sales of item displayed nearby, even if the item itself does not contribute significantly to sales volume. Similarly, a retail store operator may use a foot traffic attribution system to determine that particular items should be placed in particular locations (e.g., next to each other, at the back of the store, etc.) to increase foot traffic or increase conversions.

It will further be understood that the term "foot traffic" may be used herein generally to refer to a geophysical location at which a person is determined to be standing or walking via detection of radio signals transmitted by a mobile device that the person is carrying or wearing. "Foot traffic" may thus be understood to include information about the location of a mobile device, and in some embodiments may include additional information such as the direction of travel (e.g., based on previously determined locations of the mobile device), duration of time spent in a particular area, relationships between items displayed near a foot traffic area and items that are later involved in point of sale transactions, and the like. Although example embodiments herein refer to foot traffic, it will be understood that the present disclosure is not limited to any particular type of traffic. Further, although example embodiments herein refer to retail store and concession store floor plans, it will be understood that the present disclosure is not limited to these examples and includes other types of area plans.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

Figure 1:
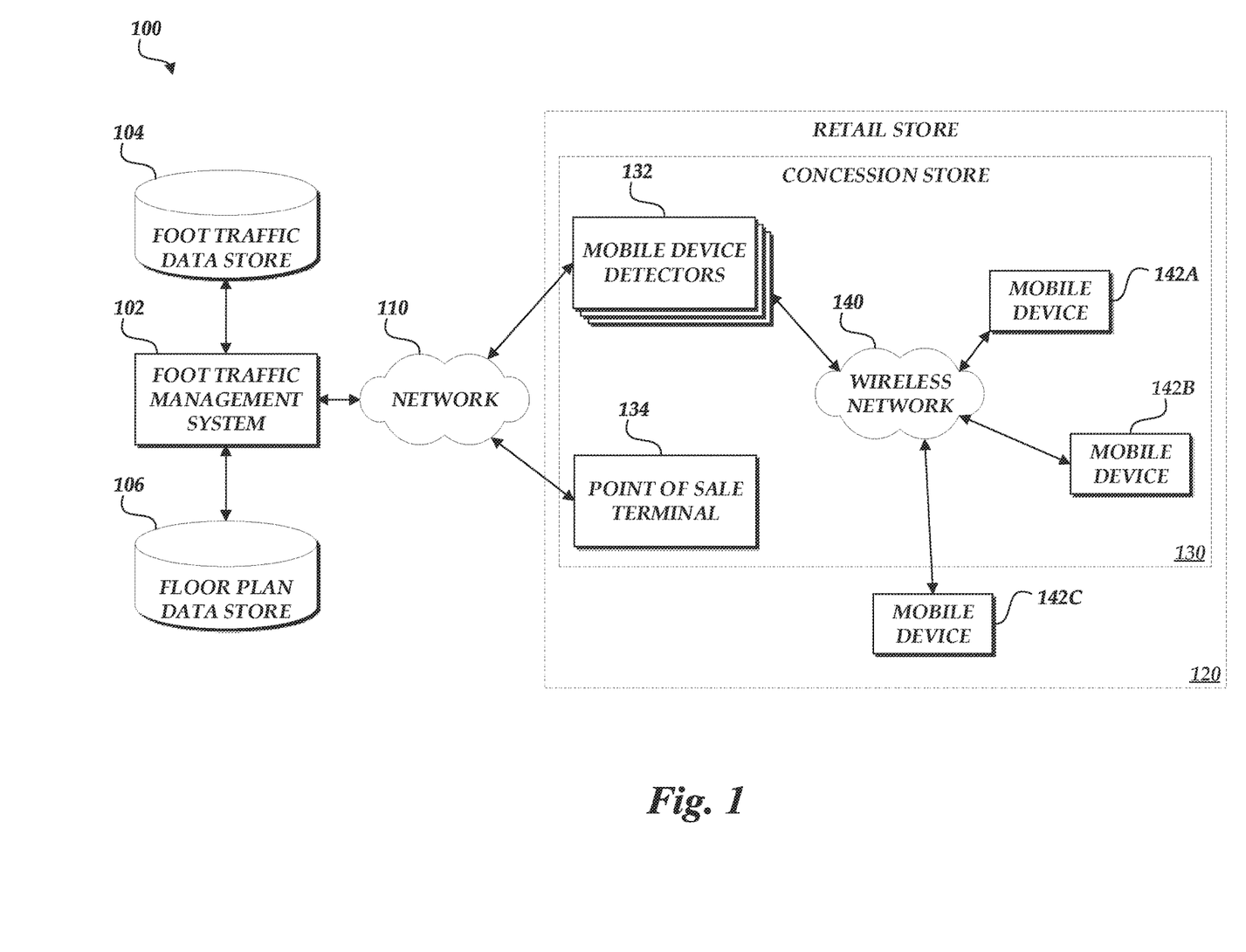
FIG. 1 is a block diagram depicting an example environment in which a foot traffic management system detects foot traffic, attributes the foot traffic to various items or item display areas, and determines updated retail floor plans in accordance with aspects of the present disclosure.

FIG. 1 is a block diagram of an illustrative operating environment 100 in which a foot traffic attribution system 102 may interact with mobile device detectors 132 and a point of sale terminal 134 via a network 110. In some embodiments, the mobile device detectors 132 and point of sale terminal 134 may be physically located in a concession store 130, which in turn may be located in a retail store 120. The mobile device detectors 132 may communicate with mobile devices 142A-C via a wireless network 140. In various embodiments, the mobile devices 142A-C may be located inside or outside the concession store 130 and/or the retail store 120 at various times.

The foot traffic attribution system 102 is described in more detail with reference to FIG. 5, and may generally be any computing device that implements aspects of the present disclosure. In various embodiments, the foot traffic management system 102 may be physically located in the concession store 130 and/or the retail store 120. In some embodiments, all or part of the functionality of the foot traffic management system 102 may be implemented by another computing device, such as the point of sale terminal 134 or the mobile device detectors 132. In other embodiments, the foot traffic management system 102 may be implemented on an external computing device.

The foot traffic attribution system 102 may communicate with a foot traffic data store 104 and a floor plan data store 106. The foot traffic data store 104 and floor plan data store 106 may illustratively be any non-transient computer-readable data store including magnetic media, optical media, solid state devices, flash memories, EEPROMs, or other storage media. In various embodiments, the foot traffic data store 104 and floor plan data store 106 may be implemented as a database, a database server, a component of another server or service, or may include or be embodied in a data storage web service. In some embodiments, all or part of the foot traffic data store 104 and floor plan data store 106 may be implemented as a single data store, or may be implemented by or as a component of the foot traffic attribution system 102. Additionally, in some embodiments, the foot traffic attribution system 102 may communicate with the foot traffic data store 104 and floor plan data store 106 via the network 110.

In some embodiments, the foot traffic attribution system 102 may communicate with data stores associated with the retail store 120. For example, the foot traffic attribution system 102 may communicate with an inventory data store of items offered by the retail store 120, an employee data store that provides information regarding employees of the retail store 120 (e.g., whether any of the mobile devices 142A-C are owned by employees), a customer data store that can be used to identify existing customers of the retail store, a transaction data store that provides information regarding item sales, and the like. In various embodiments, as described in more detail below, the foot traffic attribution system 102 may use the data obtained from the retail store to filter out foot traffic generated by store employees, identify repeat customers, associate foot traffic with particular transactions, and so forth.

The network 110 may illustratively be any wired or wireless network, or combination thereof. In addition, the network 110 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or some other type of wireless network. The network 110 may use protocols and components for communicating via the Internet or any of the other aforementioned types of networks. In some embodiments, the network 110 may be omitted, and one or more of the foot traffic attribution system 102, mobile device detectors 132, and point of sale terminal 134 may communicate directly with each other.

The retail store 120 may illustratively be any physical environment in which items are displayed to interested parties. In one embodiment, the retail store 120 is a department store that makes various categories of items (clothing, jewelry, sporting goods, etc.) available for retail purchase. It will be understood that FIG. 1 depicts a retail store 120 for purposes of example, and that the present disclosure is not limited to any particular type of store. For example, embodiments of the present disclosure may be implemented by wholesalers, factory outlets, showrooms, conventions, festivals, markets, trade shows, or any other environment in which items are physically displayed and viewed.

The concession store 130 may illustratively be a subsection of the retail store 120 that is configured as a display area for a particular set of items, which in some embodiments may not otherwise be displayed or offered by the retail store 120. In some embodiments, the concession store 130 may be distinguished from the retail store 120 by differences such as color schemes, branding, flooring, logos, and the like. An example floor plan of the concession store 130 is described in more detail with reference to FIG. 2, below. In some embodiments, the concession store 130 may be owned and/or operated independently of the retail store 120, and the foot traffic management system 102 may communicate with the retail store 120 by means of application programming interfaces ("APIs") or other interfaces.

The concession store 130 may include a number of mobile device detectors 132. Illustratively, the mobile device detectors 132 may be any devices with the capability to detect wireless signals transmitted by a mobile device 142A-C within the concession store 130, or in some embodiments within or outside the retail store 120. Examples of mobile device detectors 132 include Wi-Fi® access points, Bluetooth® transceivers, near field communication ("NFC") receivers, Radio Frequency Identification ("RFID") tag detectors, cellular telecommunications hardware (e.g., picocells, repeaters, in-building antennas, etc.), or other devices that receive wireless signals from mobile devices 142A-C. In some embodiments, the mobile device detectors 132 may be passive detectors that do not transmit any signals to the mobile devices 142A-C. In other embodiments, the mobile device detectors 132 may transmit signals such as network identifiers, pilot channels, or other transmissions that cause a mobile device 142A-C to transmit a signal in response. The mobile device detectors 132 may illustratively use the detected signals and their characteristics (e.g., signal strength, propagation delay, etc.) to determine a distance between the individual device detector 132 and the mobile device 142A-C, which (as described in more detail below) may be used to determine a position of the mobile device relative to various elements of the floor plan of the concession store 130. In some embodiments, the concession store 130 may include a point of sale terminal 134, which may transmit information regarding transactions made in the concession store 130 to the foot traffic attribution system 102 via the network 110 or another network.

The illustrative operating environment 100 further includes a wireless network 140. The wireless network 140 may illustratively be any wireless network whose coverage area includes all or part of the concession store 130 and/or the retail store 120. In some embodiments, the wireless network 140 and the network 110 may be the same network. In other embodiments, the wireless network 140 may be omitted, and the mobile device detectors 132 may enable point-to-point wireless communications with (or may passively detect transmissions from) the mobile devices 142A-B without forming a network.

The mobile devices 142A-C may illustratively be any mobile devices that implement aspects of the present disclosure. For example, the mobile devices 142A-C may be cellular phones, tablets, smartphones, wearables, augmented reality ("AR") devices, or other devices that may be worn or carried. In the illustrated embodiments, the mobile devices 142A and 142B are physically within the concession store 130, while the mobile device 142C is outside the concession store 130 but within the retail store 120. In various embodiments, the mobile devices 142A-C may be inside the concession store 130, outside the concession store but within the retail store 120, or outside both the concession store 130 and the retail store 120. In further embodiments, the mobile devices 142A-C may move between the concession store 130, the retail store 120, and outside both stores 130 and 120 as the user of the mobile device 142A-C walks around. It will be understood that three mobile devices 142A-C are depicted in FIG. 1 for purposes of example, and that the present disclosure is not limited to any particular number of mobile devices 142A-C. In various embodiments, the mobile devices 142A-C may have unique identifiers such as mobile device numbers ("MDNs"), media access control addresses ("MAC addresses"), international mobile subscriber identity ("MR") numbers, serial numbers, user IDs, or other identifiers that enable detecting and associating foot traffic or retail transactions with a particular mobile device 142A-C.

It will be understood that the operating environment 100 may include more (or fewer) elements than those shown in FIG. 1. It is not necessary, however, that all of these elements be shown in order to provide an enabling disclosure.

Figure 2:
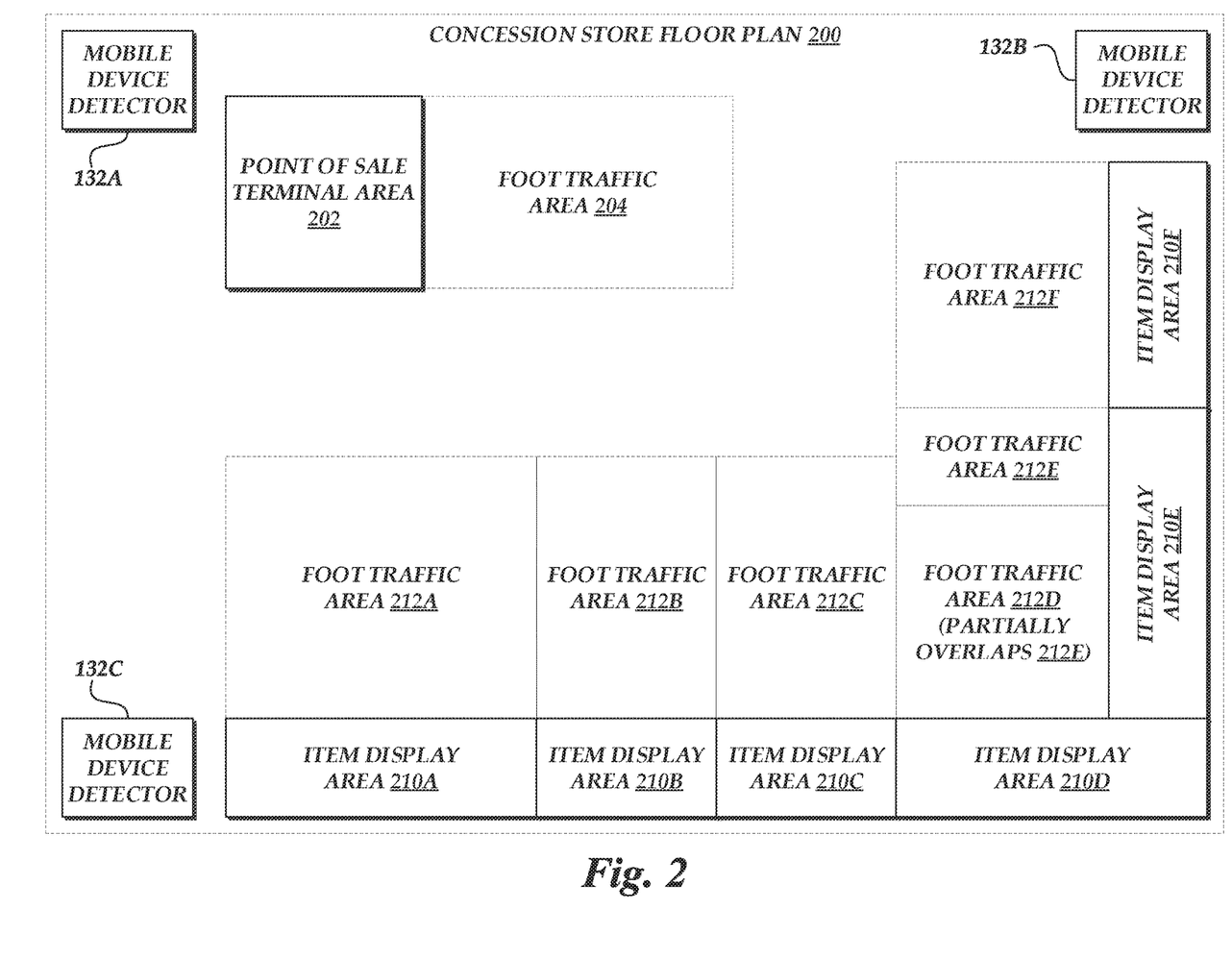
FIG. 2 is a pictorial diagram depicting an example retail floor plan on which foot traffic may be managed in accordance with aspects of the present disclosure.

FIG. 2 is a pictorial diagram of an example floor plan 200 showing the physical layout of the concession store 130 depicted in FIG. 1. The example floor plan 200 includes physical locations of the mobile device detectors 132A-C, which may be distributed in a manner that allows determining the location of a mobile device 142A-C (not shown in FIG. 2) relative to the floor plan 200. For example, the mobile device detectors 132A-C may be positioned at corners of a rectangular floor plan. While it will be understood that the present disclosure is not limited to any particular number of mobile device detectors 132A-C, the use of multiple mobile device detectors 132A-C may facilitate greater accuracy when estimating the location of a mobile device 142A-C. As discussed above, the mobile device detectors 132A-C may be any devices that receive wireless signals from the mobile devices 142A-C.

In some embodiments, the floor plan 200 includes a point of sale terminal area 202, which may correspond to the physical location of the point of sale terminal 134 depicted in FIG. 1. In some embodiments, the point of sale terminal area 202 may include a desk, table, counter, conveyor belt, or other furnishings or facilities that enable point of sale transactions. The point of sale terminal area 202 may be associated with a foot traffic area 204, in which customers who are waiting to make a transaction may be located. For example, the foot traffic area 204 may correspond to a line, queue, or other waiting area for shoppers who are waiting to make a purchase.

The floor plan 200 further includes a number of item display areas 210A-F, which in the illustrated embodiment span two sides of the rectangular floor plan 200. The item display areas 210A-F may illustratively be shelving units, tables, clothing racks, or other features for displaying items from the inventory of the concession store 130. In some embodiments, each of the item display areas 210A-F corresponds to a single item and is defined as the display space allocated to that item. The item display areas 210A-F may illustratively vary in size relative to each other, and in some embodiments may overlap when viewed from above. For example, a shelving unit may contain five shelves, the upper three of which are classified as a first item display area 210A and the lower two classified as a second item display area (not depicted in FIG. 2).

The floor plan 200 further includes a number of foot traffic areas 212A-F, which in various embodiments may be determined by a foot traffic attribution system (e.g., the foot traffic attribution system 102 depicted in FIG. 1) or defined by a user of a foot traffic attribution system. The foot traffic areas 212A-F indicate areas where patrons of the concession store 130 may stand and/or walk while viewing items displayed in the item display areas 210A-F. In some embodiments, the foot traffic areas 212A-F may have a one-to-one correspondence with the item display areas 210A-F. In other embodiments, a foot traffic area (e.g., foot traffic area 212D) may correspond to more than one item display area 210D and 210E. In the illustrated embodiment, foot traffic area 212D partially overlaps foot traffic area 212E, indicating an area of the floor plan 200 where a person may be viewing items in either of the item display areas 210D and 210E. The non-overlapping portion of the foot traffic area 212E is then unambiguously associated with a single item display area 210E. In some embodiments, the foot traffic areas 212A-F may be defined in terms of confidence levels or zones, such that a person standing at the bottom middle of the foot traffic area 212B is more likely to be browsing the item display area 210B, while a person standing at the upper right corner of the foot traffic area 212B may be less likely to be browsing the item display area 210B. As described in more detail below, the foot traffic attribution system 102 may collect information from the mobile device detectors 132A-C to determine a current location of a mobile device 142A-C relative to the foot traffic areas 212A-F and item display areas 210A-F, and may analyze the current location (and, in some embodiments, previously determined locations of the mobile device 142A-C) to attribute responsibility for the foot traffic in the concession store 130 to the various items displayed in the item display areas.

In some embodiments, the floor plan 200 may include information regarding the layout of the retail store 120 or the position of the concession store 130 relative to the retail store 120. For example, the floor plan 200 may include information regarding walls, entrances, and exits of the concession store 130 and/or the retail store 120, may indicate whether and which of the item display areas 210A-F are externally visible (e.g., to shoppers in the retail store 120 or to passersby), or may indicate other environmental conditions (e.g., ceiling heights, maximum allowed heights of item display areas 210A-F, positions of light fixtures, heating and air conditioning vents, support columns, electrical outlets, or other features).

In some embodiments, the floor plan 200 may include foot traffic areas (not depicted in FIG. 2) that extend outside the boundaries of the concession store 130. For example, one or more of the item display areas 210A-F may be tables or clothing racks that are visible from outside the concession store 130. The floor plan 200 may therefore include foot traffic areas that cover approaching the item display area 210A-F from outside the concession store 130. In other embodiments not depicted, item display areas may have different shapes than those depicted in FIG. 2, such as ovals, circles, or other polygons. The corresponding foot traffic areas may be toroidal (e.g., a "donut" shape around a circular item display area). In yet other embodiments, the item display areas 210A-F and/or foot traffic areas 212A-F may be discontinuous.

Figure 3:
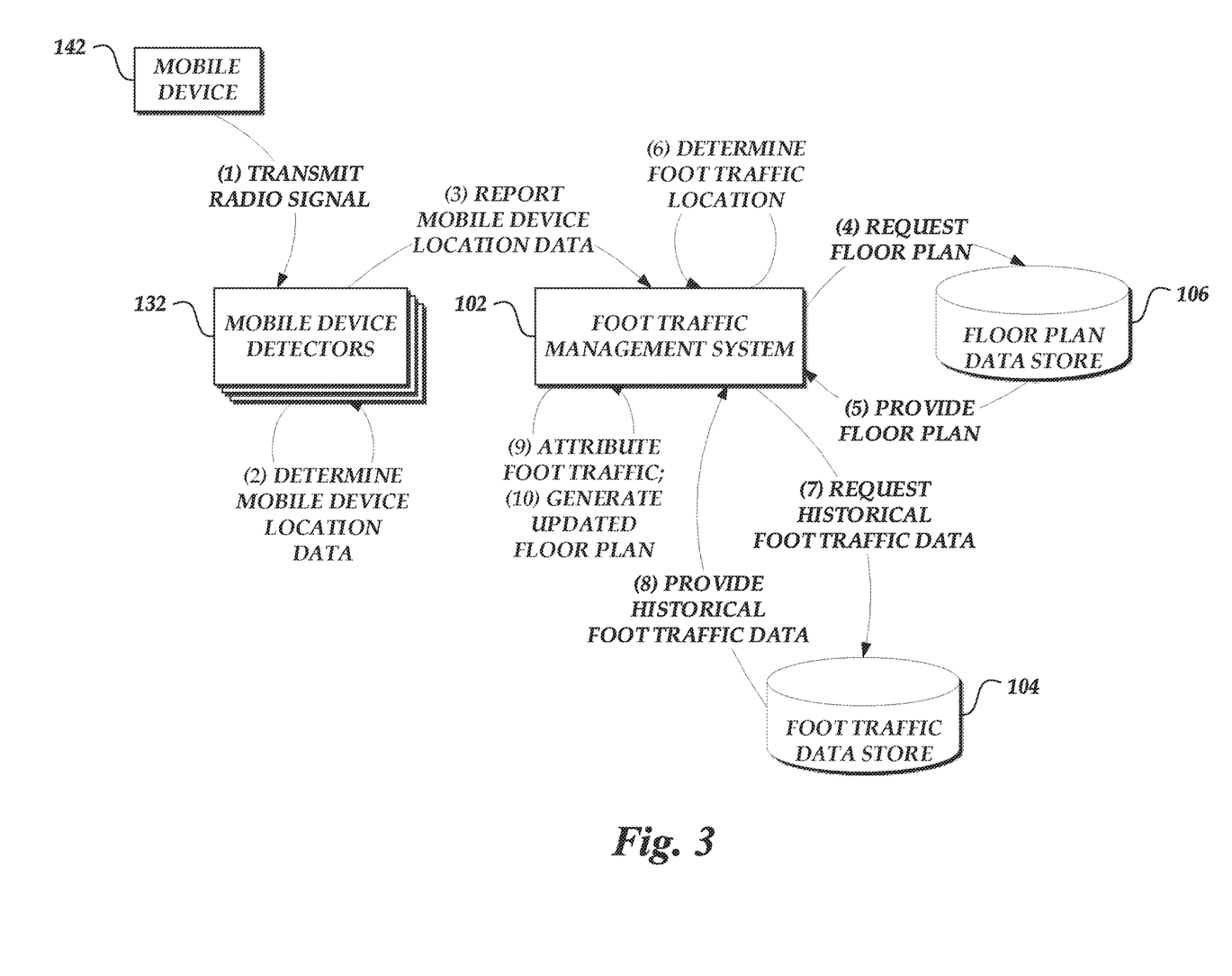
FIG. 3 is a flow diagram depicting illustrative interactions for managing foot traffic and generating updated floor plans in accordance with aspects of the present disclosure.

FIG. 3 depicts example interactions for detecting and attributing foot traffic and generating updated floor plans in accordance with aspects of the present disclosure. At (1), a mobile device 142 transmits a radio signal that is received by one or more mobile device detectors 132. Illustratively, the radio signal may be transmitted using various protocols, such as Bluetooth, Wi-Fi, LTE, and the like, and may be transmitted at various frequencies. In some embodiments, the mobile device detectors 132 may be equipped to detect particular transmissions or protocols, such as Bluetooth or Wi-Fi signals in the frequency ranges normally reserved for those protocols. In further embodiments, the mobile device detectors 132 may transmit using these protocols and frequencies to elicit a response from the mobile device 142. In other embodiments, the mobile device detectors 132 may passively detect signals from the mobile device 142 without transmitting any signals.

At (2), the mobile device detectors 132 may determine mobile device location data corresponding to the mobile device 142. In various embodiments, the mobile device detectors 132 may determine mobile device location data by analyzing various characteristics of the received radio signal, such as the received signal strength or a measured time delay between transmitting a signal to the mobile device 142 and receiving a response. Illustratively, each of the mobile device detectors 132 may determine an estimated distance between the detector 132 and the mobile device 142, a relative direction from which the radio signals are being received, or combinations thereof. In some embodiments, the mobile device 142 may transmit, either independently or at the request of the mobile device detectors 132, positioning data from a satellite network (e.g., the Global Positioning System) or other network that facilitates determining a precise location of the mobile device 142.

At (3), the individual mobile device detectors 132 may report their location data to the foot traffic attribution system 102. At (4), the foot traffic attribution system 102 may request a floor plan (e.g., the floor plan 200 depicted in FIG. 2) from the floor plan data store 106. Illustratively, the floor plan may include the locations of the mobile device detectors 132, which may facilitate using the reported location data. At (5), the floor plan data store 106 returns the requested floor plan.

At (6), the foot traffic attribution system 102 may analyze the location data and the floor plan to determine foot traffic data, which may include a current location of the mobile device 142 relative to the floor plan. Illustratively, the foot traffic attribution system 102 may analyze the location data obtained from multiple mobile device detectors 132 to determine relative distances between individual mobile device detectors 132 and the mobile device 142, and may then triangulate the position of the mobile device 142 using the floor plan. In some embodiments, the foot traffic attribution system 102 may not have enough information to precisely determine the relative position of the mobile device 142. In such embodiments, the foot traffic attribution system may determine an area that contains the mobile device 142.

At (7), in some embodiments, the foot traffic attribution system 102 may request historical foot traffic data from the foot traffic data store 104. Illustratively, the historical foot traffic data may include previous locations of the mobile device 142. The historical foot traffic data may allow the foot traffic attribution system 102 to determine additional foot traffic data, such as a direction of travel of the mobile device, a duration of time spent in a particular foot traffic area, and so forth. At (8), the foot traffic data store 104 provides the requested historical foot traffic data.

At (9), foot traffic attribution system 102 determines an attribution of the current foot traffic to one or more item display areas in the floor plan. In some embodiments, the foot traffic attribution system 102 may determine an attribution of the current foot traffic to one or more items associated with the item display areas. Illustratively, the foot traffic attribution system 102 may determine the attribution based on factors such as the relative position of the mobile device 142 within a foot traffic area, a determined direction of travel, time spent in a particular foot traffic area, proximity to an item display area, and other such factors. For example, the foot traffic attribution system 102 may determine, based on current and historical foot traffic data, that the foot traffic indicates a person walked from foot traffic area 212C to foot traffic area 212D, has been in foot traffic area 212D for a threshold time period, and is currently standing closer to item display area 210E than to any other item display area. The foot traffic attribution system 102 may therefore determine that the person has walked to the item display area 210E, and may attribute the foot traffic to the item display area 210E. As a further example, the foot traffic attribution system 102 may determine that a person came from outside the concession store 130 into foot traffic area 212F for a threshold duration, and may therefore determine that an item in item display area 210F drew the person into the concession store 130. As a still further example, the foot traffic attribution system 102 may determine that a person spent 60% of their time in the concession store 130 in foot traffic area 212A, and the other 40% of their time in foot traffic area 212B. The foot traffic attribution system 102 may therefore attribute the foot traffic in similar proportions to item display areas 210A and 210B.

In some embodiments, the foot traffic attribution system 102 may obtain transaction data from a point of sale terminal, such as the point of sale terminal 134 depicted in FIG. 1, and may associate or correlate the transaction data with the foot traffic data corresponding to a particular mobile device. For example, the foot traffic attribution system 102 may determine that a person carrying a mobile device entered the concession store, spent a threshold duration of time (e.g., 60 seconds) in foot traffic area 212A, then spent time in foot traffic area 204, which is associated with the point of sale terminal area 202. The foot traffic attribution system 102 may further obtain transaction data from the point of sale terminal 134 indicating that a transaction occurred while the person was in the foot traffic area 204, involving an item that was displayed in item display area 210A. The foot traffic attribution system 102 may therefore determine that the person was drawn into the concession store by the item in display area 210A and subsequently purchased the item. The foot traffic attribution system 102 may therefore credit or otherwise attribute the transaction to the display area 210A, and may associate the transaction with the particular mobile device that was detected in foot traffic areas 212A and 204. In some embodiments, the foot traffic attribution system 102 may store identifiers of mobile devices associated with foot traffic data, and may maintain a record of transactions and foot traffic associated with individual mobile devices. In further embodiments, the foot traffic attribution system 102 may determine that a person was drawn into the concession store by a first item (e.g., an item displayed in the item display area 210A), but the person subsequently purchased a second item. The foot traffic attribution system 102 may thus attribute some or all of the transaction to the first item, since the foot traffic and the subsequent transaction involving the second item otherwise might not have occurred.

In some embodiments, if a transaction occurs at the point of sale terminal 202 after a mobile device was detected in foot traffic area 204, the foot traffic attribution system 102 may store a unique identifier (e.g., MAC address, IMSI number, etc.) of the mobile device in a customer information data store. The customer information data store may thus associate mobile device identifiers with purchase histories, and may store information such as the amount a particular customer spent in total, how many times a customer purchased items in the concession store, or whether a certain customer meet various criteria (e.g., a threshold amount spent in the concession store, threshold one-time purchase price, threshold number of purchases at the concession store, etc.). In some embodiments, a customer who satisfies one or more criteria may be identified as a "good" customer and may receive preferential treatment on that basis. For example, a salesperson may receive a text message when a good customer is nearby that identifies items of interest to the customer or shopping preferences of the customer. In some embodiments, the foot traffic attribution system 102 may identify repeat customers even if no transaction occurs. For example, if a certain mobile device other than those of store personnel remains (e.g., 60 seconds) within any foot traffic area 212A-212F for a threshold duration, then the foot traffic attribute system 102 may store one or more unique identifiers of the mobile device as a potential customer or a repeat customer. In various embodiments, customer information data may be stored in a hosted computing system, also known as a "cloud," and may be shared and updated by concession stores at different locations.

At (10), in some embodiments, the foot traffic attribution system 102 may generate an updated floor plan for the concession store 130 based on its attributions of the foot traffic. In various embodiments, the foot traffic attribution system 102 may generate an updated floor plan that increases or decreases the size of an item display area, changes or rearranges the items displayed in the item display areas, or otherwise updates the items or item display areas. For example, the foot traffic attribution system 102 may determine that a particular item is not generating significant amounts of foot traffic, and may therefore replace the item with a different item. As a further example, the foot traffic attribution system 102 may determine that a particular item is drawing potential customers into the concession store 130, and may therefore change which item display area is associated with the item to make the item more visible to customers outside the concession store 130, cause customers to walk past other items, or otherwise change patterns of foot traffic that the foot traffic attribution system 102 has detected. As still further examples, the foot traffic attribution system 102 may generate an updated floor plan that includes a recommendation to remove an item from the concession store 130 or migrate an item from the concession store 130 to the retail store 120.

In some embodiments, the foot traffic attribution system 102 may identify mobile devices 142 that are associated with employees of the concession store 130 or the retail store 120, and may exclude these mobile devices 142 from its determinations. For example, the foot traffic attribution system 102 may maintain a list of mobile device identifiers (e.g., MAC addresses, IMSI numbers, etc.) associated with store personnel, and may filter and remove the associated mobile devices 142 when identifying and attributing foot traffic or generating updated floor plan recommendations. The foot traffic attribution system 102 may similarly maintain a list of mobile device identifiers associated with customers, and may identify particular customers based on detected mobile device identifiers. In other embodiments, the foot traffic attribution system 102 may use stored associations between mobile device identifiers and customers to determine which mobile devices 142 are associated with repeat customers and which are associated with unique (e.g., first-time) customers, and may generate updated floor plans based on the foot traffic characteristics of each group. For example, the foot traffic attribution system 102 may generate an updated floor plan that places items that attract first-time customers near the entrance to the concession store 130, and places items of interest to repeat customers at the back of the concession store 130. In further embodiments, the foot traffic attribution system 102 may identify "good" customers (e.g., customers with a high volume of transactions, customers who have previously purchased high-value items, customers who consistently purchase items, and so forth), and may alert store personnel to the presence or pending arrival of such customers. In some embodiments, the foot traffic attribution system 102 may access retailer data stores to identify and filter out employees, identify "good" (or "bad") customers, identify repeat customers, and so forth. For example, the foot traffic attribution system 102 may obtain data from a point of sale system, associate sales data with particular customers based on foot traffic and unique mobile device identifiers, and identify customers whose volume, value, and/or frequency of purchases is above average or exceeds a threshold.

It will be understood that FIG. 3 is provided for purposes of example, and that many variations on the interactions depicted in these examples are within the scope of the present disclosure. For example, the interactions at (4) and (5) may be carried out prior to one or more of the interactions at (1), (2), and (3), and may be carried out periodically or on an as-needed basis. As a further example, the interactions at (7) and (8) may be omitted, and the foot traffic attribution system 102 may attribute foot traffic based solely on current foot traffic data. FIG. 3 is thus understood to be illustrative and not limiting.

Figure 4:
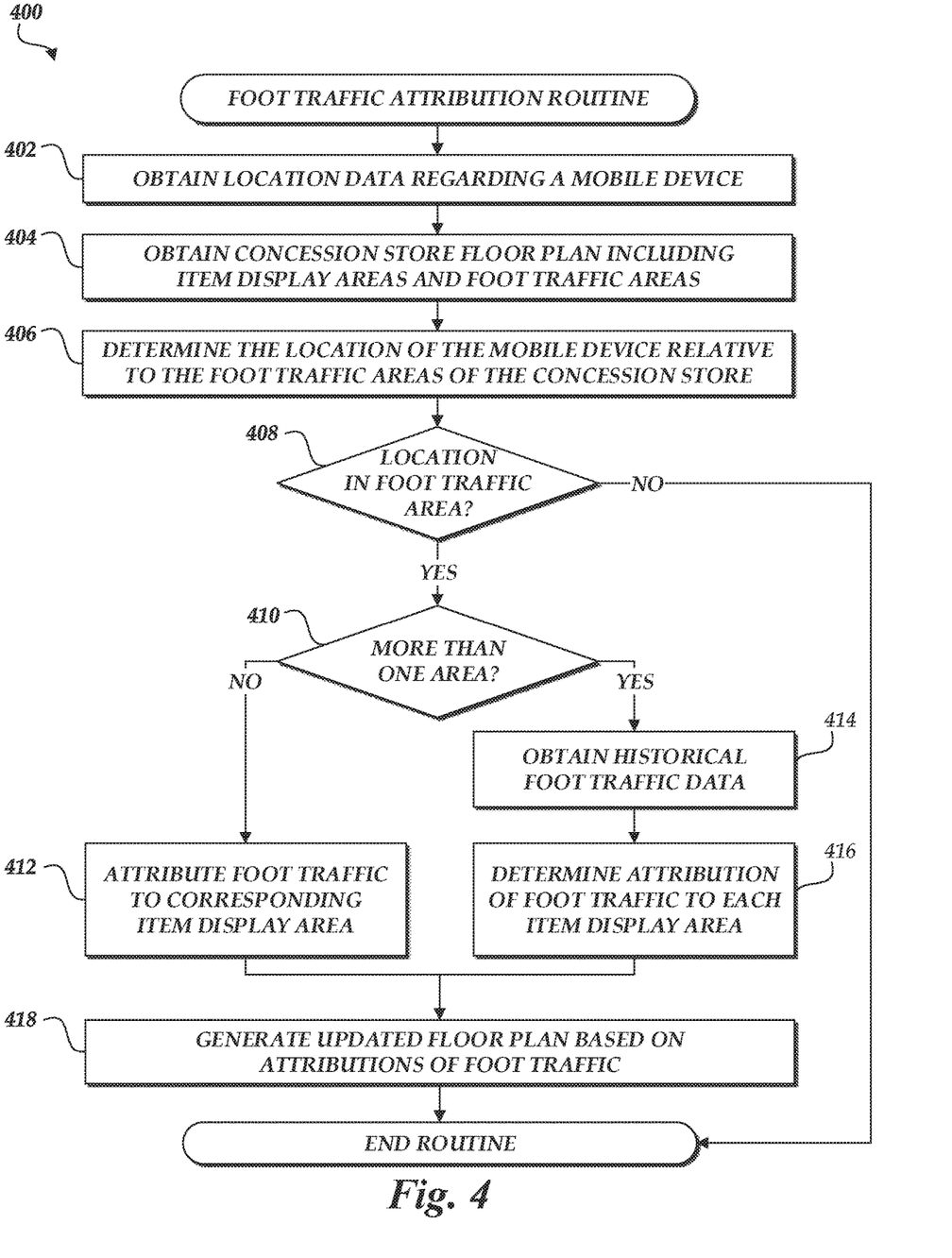
FIG. 4 is a flowchart depicting an example routine for managing foot traffic and generating updated retail floor plans in accordance with aspects of the present disclosure.

FIG. 4 is a flow chart depicting an example routine 400 for detecting and attributing foot traffic and generating updated floor plans in accordance with aspects of the present disclosure. All or part of the routine 400 may be carried out, for example, by the foot traffic attribution module 524 and/or the floor plan generation module 526 of the foot traffic attribution system 102, as depicted in FIG. 5. The routine 400 begins at block 402, where location data regarding a mobile device may be obtained. Illustratively, as described above, location data may be obtained from one or more mobile device detectors (e.g., the mobile device detectors 132 depicted in FIG. 1). The location data may include, for example, an estimated distance between the mobile device and each of the mobile device detectors. At block 404, a concession store floor plan may be obtained. As described above with reference to FIG. 2, the concession store floor plan may identify the positions of mobile device detectors relative to foot traffic areas, item display areas, point of sale terminal areas, and other features of the concession store.

At block 406, a location of the mobile device may be determined relative to the foot traffic areas of the concession store. Illustratively, as described above, the mobile device's location may be determined from the location data obtained from the mobile device locators. At decision block 408, a determination may be made regarding the mobile device location and the foot traffic areas of the floor plan. For example, each mobile device detector 132A-C may determine a distance between itself and a mobile device, and may use triangulation and the locations of the mobile device detectors 132A-C to determine the location of the mobile device relative to the concession store floor plan. In some embodiments, the concession store floor plan may be implemented as (or converted into) a coordinate grid overlaid on a particular geographic region, and the location data may be used to identify a grid coordinate that is associated with the mobile device's location. In other embodiments, the location data may be used to determine a precise latitude and longitude of the mobile device, which may be compared to latitudes and longitudes of the foot traffic areas. If the determination is that the mobile device location does not fall within any of the foot traffic areas, then the routine 400 ends. In some embodiments, the routine 400 may be re-invoked when further location data is available. In other embodiments, the routine 400 branches to block 402 and waits until further location data can be obtained.

If the determination at decision block 408 is that the mobile device location does fall within at least one foot traffic area, then at decision block 410, in some embodiments, a determination is made regarding the number of foot traffic areas that overlap the mobile device location. Illustratively, the foot traffic areas in a concession store may be associated with item display areas, and in some embodiments the foot traffic areas may overlap each other, indicating that customers standing at certain places in the store (e.g., the southeast corner of FIG. 2, where foot traffic areas 212D and 212E overlap) could potentially be browsing one of a number of items (e.g., the item in item display area 210D, or the item in item display area 210E). In some embodiments, the determination may be the foot traffic area identified in decision block 408 corresponds to more than one item display area. If the determination at decision block 410 is that the foot traffic represented by the location of the mobile device can be attributed to a single foot traffic area (and, in some embodiments, that the foot traffic area corresponds to a single item display area), then the routine 400 branches to block 412 and attributes the foot traffic to the item display area corresponding to the foot traffic area. In some embodiments, the foot traffic may be attributed based on a purchase rather than on the foot traffic areas. For example, if the customer stands in a foot traffic area associated with a first item and then purchases an item displayed in a different item display area, the routine 400 may attribute the foot traffic to the purchased item rather than to the first item.

If the determination at decision block 410 is that the foot traffic represented by the location of the mobile device cannot be attributed to a single item display area, then at block 414, in some embodiments, historical location data may be obtained. Illustratively, as described above, the historical location data may contain previous locations of the mobile device as well as timestamps that may be used to determine how long the mobile device spent in individual foot traffic areas. At block 416, the current and historical foot traffic data may be used to determine an attribution of the foot traffic to the item display areas. As described above, in various embodiments the attribution may be entirely to one of the item display areas or proportionally to multiple item display areas based on factors such as proximity, direction of travel, duration of time spent in each foot traffic area, relative sizes of the foot traffic areas, conversion rates or sales data associated with the foot traffic areas, or other such patterns or characteristics of the foot traffic data.

In some embodiments, foot traffic may be attributed using a formula or algorithm. For example, the proportion of foot traffic to attribute to foot traffic area A may be determined using the formula $P_a/(P_a+P_b)$, where $P_a$ is the amount of time spent in foot traffic area A and $P_b$ is the amount of time spent in foot traffic area B and/or other foot traffic areas. As a further example, a point system may be used that incorporates factors such as a direction of travel (e.g., ten points if the customer changed their direction of travel to enter the concession store and/or a particular foot traffic area, or if the customer returned to a foot traffic area after spending a threshold duration of time there within the same visit), whether a transaction occurred after the customer spent time in a foot traffic area (e.g., from one to ten points depending on the duration of time spent in the foot traffic area), the amount of time elapsed from when the customer exited a foot traffic area near an item to when a transaction occurred (e.g., ten points if the elapsed time is less than 30 seconds, nine points for 30-40 seconds, eight points for 40-50 seconds, etc.), physical proximity to the item display area (e.g., ten points if less than 60 centimeters, nine points for 60-70 cm, etc.), previous visits to the foot traffic area (e.g., ten points if so), total or longest time spent in the foot traffic area (e.g., one point per five seconds to a maximum of ten points), and so forth.

At block 418, an updated floor plan may be generated based on the attribution of foot traffic. In some embodiments, block 418 may be carried out periodically (e.g., on a weekly or monthly basis) or after a threshold amount of foot traffic data has been attributed. As described above, the updated floor plan may include different allocations of items to item display areas, different item display areas, different items, or other variations on the original floor plan. In some embodiments, an updated floor plan may be generated based on an objective specified by the operator of the concession store, such as maximizing foot traffic, item transactions, revenue, profit, or other criteria. In some embodiments, an updated floor plan may be generating by comparing the attributions of foot traffic for current and previous floor plans. For example, foot traffic attributions for current and previous floor plans may be compared to determine that placing any item in a particular item display area leads to increased food traffic and increased sales of that item. An updated floor plan may therefore be generated that assigns items to the desirable item display area based on factors such as profitability, inventory stock, sales targets, or other factors. Alternatively, current and previous floor plans may be compared to identify item display areas that are comparable in terms of the amounts of foot traffic they receive. An updated floor plan may then be generated that allows "apples-to-apples" comparisons and isolates the effects of the items on foot traffic generation.

It will be understood that FIG. 4 is provided for purposes of example, and that many variations on the routine 400 are within the scope of the present disclosure. For example, blocks 402 and 404 may be carried out in any order or in parallel. As a further example, the historical foot traffic data obtained at block 414 may be used to determine a duration of time spent in each foot traffic area, a direction of travel, or other characteristics of the foot traffic. As a still further example, as described in more detail above, transaction data may be obtained from a point of sale terminal as part of the routine 400 and may be correlated with the foot traffic data. The depicted routine 400 is thus understood to be illustrative and not limiting.

Figure 5:
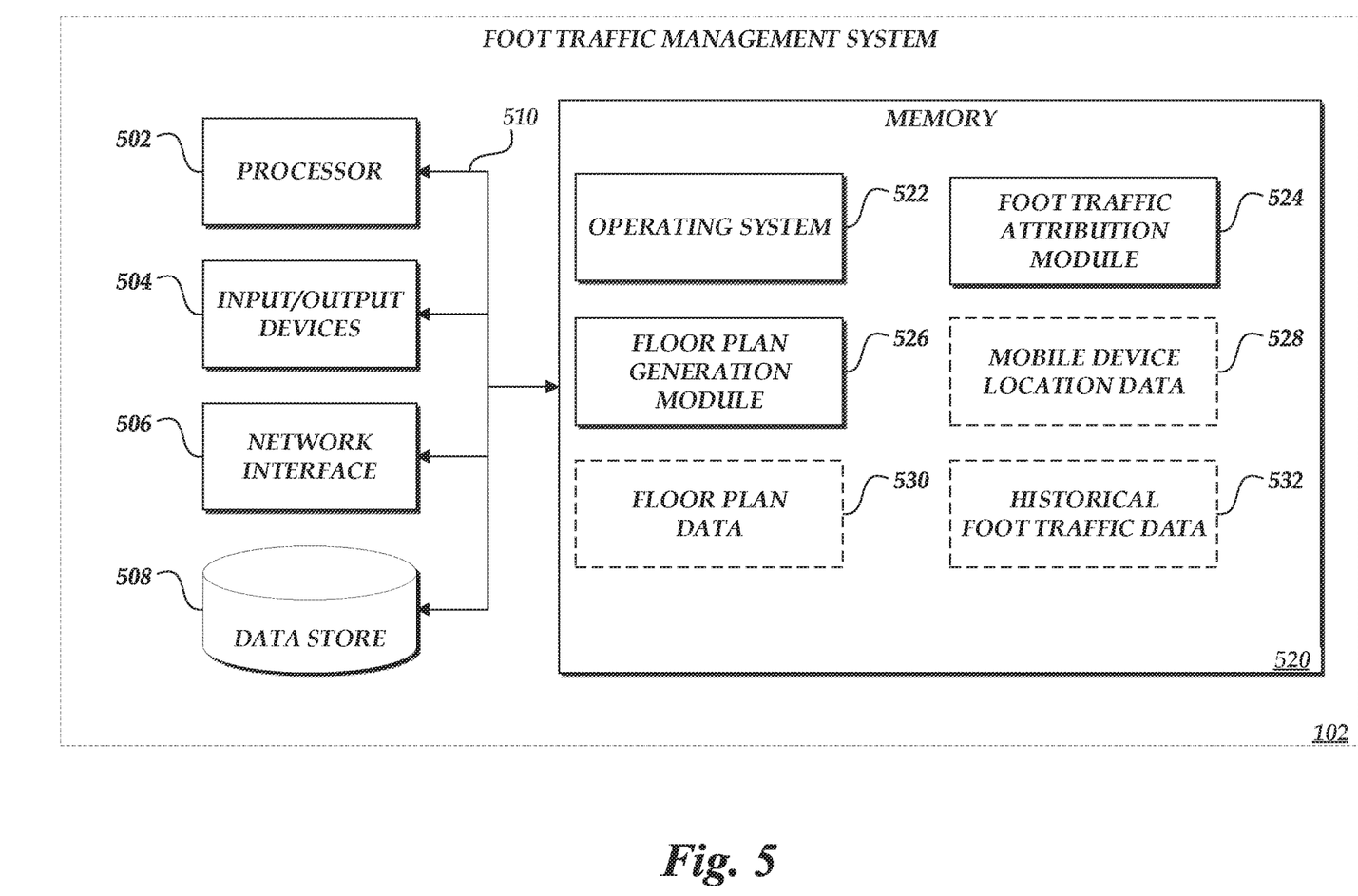
FIG. 5 depicts a general architecture of a computing device implementing a foot traffic management system in accordance with aspects of the present disclosure.

FIG. 5 depicts a general architecture of a computing device 500 that includes an arrangement of computer hardware and software configured to implement aspects of the present disclosure. The computing device 500 may include many more (or fewer) elements than those shown in FIG. 5. It is not necessary, however, that all of these elements be shown in order to provide an enabling disclosure.

As illustrated, the computing device 500 includes a processor 502, input/output devices 504, a network interface 506, and a data store 508, all of which may communicate with one another by way of a communication bus 510. The network interface 506 may provide connectivity to one or more networks (such as the network 110 depicted in FIG. 1) or computing systems and, as a result, may enable the computing device 500 to receive and send information and instructions from and to other computing systems or services, such as the mobile device detectors 132 or the point of sale terminal 134 depicted in FIG. 1. In some embodiments, the computing device 500 may be configured to process requests from other devices or modules, such as requests to initiate network communications. The data store 508 may illustratively be any non-transitory computer-readable data store, and in some embodiments may include all or part of the foot traffic data store 104 and/or floor plan data store 106 depicted in FIG. 1.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the computing device 500. The memory 520 may further store specific computer-executable instructions and other information (which may be referred to herein as "modules" or "engines") for implementing aspects of the present disclosure. For example, the memory 520 may include a foot traffic attribution module 524 and a floor plan generation module 526, which may implement aspects of the present disclosure as described above. The memory 520 may further include mobile device location data 528, floor plan data 530, and historical foot traffic data 532, which may be loaded into the memory 520 as various operations are performed.

While the operating system 522, foot traffic attribution module 524, and floor plan generation module 526 are illustrated as distinct modules in the memory 520, in some embodiments, the foot traffic attribution module 524 and floor plan generation module 526 may be incorporated as a module or modules in the operating system 222 or another application or module, and as such, separate modules may not be required to implement some embodiments.

It will be recognized that many of the components described in FIG. 5 are optional and that embodiments of the computing device 500 may or may not combine components. Furthermore, components need not be distinct or discrete. Components may also be reorganized. For example, the computing device 500 may be represented in a single physical device or, alternatively, may be split into multiple physical devices. In some embodiments, components illustrated as part of the computing device 500 may additionally or alternatively be included in other computing devices (such as the mobile device detectors 132 or the point of sale terminal 134 of FIG. 1), such that some aspects of the present disclosure may be performed by the computing device 500 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
   a data store configured to store computer-executable instructions; and a processor in communication with the data store, wherein the computer-executable instructions, when executed by the processor, configure the processor to perform operations comprising:
  obtaining mobile device location data from at least three mobile device locators, the mobile device location data including a unique identifier for a mobile device and a relative distance between the mobile device and individual mobile device locators of the at least three mobile device locators;
  obtaining a floor plan associated with a concession store, the floor plan including:
    a first item display area associated with a first foot traffic area; and
    a second item display area associated with a second foot traffic area;
  generating, from the mobile device location data and the floor plan, current foot traffic data including a current location of the mobile device relative to the floor plan;
  determining that the current location of the mobile device overlaps at least one of the first foot traffic area or the second foot traffic area;
  obtaining historical foot traffic data, the historical foot traffic data including at least one previous location of the mobile device relative to the floor plan;
  determining, based at least in part on the current foot traffic data and the historical foot traffic data, a first duration for which the mobile device was in the first foot traffic area associated with the first item display area;
  determining, based at least in part on the current foot traffic data and the historical foot traffic data, a second duration for which the mobile device was in the second foot traffic area associated with the second item display area;
  determining, based at least in part on the current foot traffic data, the historical foot traffic data, the first duration, and the second duration, an attribution of the current foot traffic data to at least one of the first item display area or the second item display area; and
  generating, based at least in part on the attribution of the current foot traffic data, an updated floor plan for the concession store.

2. The system of claim 1, wherein the first foot traffic area at least partially overlaps the second foot traffic area.

3. The system of claim 1, wherein the first item display area is associated with a first item and the second item display area is associated with a second item.

4. The system of claim 1, wherein the updated floor plan includes one or more of an updated first item display area, updated second item display area, or updated item.

5. A computer-implemented method comprising:
  under control of a computing device configured with specific computer-executable instructions,
    obtaining, from a plurality of mobile device locators, mobile device location data including an identifier of a mobile device and a relative distance between the mobile device and individual mobile device locators of the plurality of mobile device locators;
    generating, based at least in part on the mobile device location data and an area plan, current traffic data including a current location of the mobile device relative to a first item display area and a second item display area;
    obtaining historical traffic data including at least one previous location of the mobile device relative to the first item display area and the second item display area;
    determining, based at least in part on the current traffic data and the historical traffic data, a first duration for which the mobile device was in a first traffic area associated with the first item display area;
    determining, based at least in part on the current traffic data and the historical traffic data, a second duration for which the mobile device was in a second traffic area associated with the second item display area;
    determining, based at least in part on the current traffic data, the historical traffic data, the first duration, and the second duration, an attribution of current traffic data to at least one of the first item display area or the second item display area; and
    generating, based at least in part on the attribution of the current traffic data, an updated area plan.

6. The computer-implemented method of claim 5 further comprising:
  determining, based at least in part on the current location of the mobile device and a previous location of the mobile device, a direction of travel of the mobile device relative to the first item display area and the second item display area.

7. The computer-implemented method of claim 5, wherein the historical traffic data includes one or more previous locations of each of a plurality of mobile devices.

8. The computer-implemented method of claim 7, wherein generating the updated area plan is based at least in part on attributions of the historical traffic data.

9. The computer-implemented method of claim 7 further comprising:
  filtering the historical traffic data to exclude one or more mobile devices associated with employees.

10. The computer-implemented method of claim 5, wherein the area plan includes a first traffic area associated with the first item display area and a second traffic area associated with the second item display area.

11. The computer-implemented method of claim 10, wherein the updated area plan includes a recommendation to remove one or more items from a concession store associated with the area plan.

12. The computer-implemented method of claim 10, wherein the updated area plan includes a recommendation to migrate one or more items from a concession store to a retail store.

13. The computer-implemented method of claim 5, wherein the area plan is associated with a concession store within a retail store.

14. A non-transitory computer-readable medium storing computer-executable instructions that, when executed by a processor, configure the processor to perform operations comprising:
  generating, based at least in part on mobile device location data obtained from a plurality of mobile device locators, current traffic data including a current location of a mobile device relative to an area plan;
  obtaining historical traffic data including at least one previous location of the mobile device relative to the area plan;
  determining, based at least in part on the current traffic data and the historical traffic data, a first duration for which the mobile device was in a first traffic area of the area plan, wherein the first traffic area is associated with a first item display area;

determining, based at least in part on the current traffic data and the historical traffic data, a second duration for which the mobile device was in a second traffic area of the area plan, wherein the second traffic area is associated with a second item display area;

determining, based at least in part on the current traffic data, the historical traffic data, the first duration, and the second duration, an attribution of the current traffic data to at least one of the first item display area or the second item display area; and generating, based at least in part on the attribution of the current traffic data, an updated area plan.

15. The non-transitory computer-readable medium of claim 14, wherein the area plan includes a traffic area associated with a point of sale terminal.

16. The non-transitory computer-readable medium of claim 15, storing further computer-executable instructions that, when executed by the processor, configure the processor to perform further operations comprising:

obtaining transaction data associated with the point of sale terminal, the transaction data including a timestamp associated with a first transaction; and in response to a determination that the mobile device was in the traffic area associated with the point of sale terminal when the first transaction occurred, associating the first transaction with the mobile device.

17. The non-transitory computer-readable medium of claim 16, wherein generating the updated area plan is based at least in part on the first transaction.

18. The non-transitory computer-readable medium of claim 16, wherein the first transaction is associated with a first item, and wherein the attribution of current traffic data is associated with a second item.

* * * * *